Nov. 30, 1971    J. A. RICHTER    3,623,307

FRUIT PICKING DEVICE

Filed June 9, 1969    8 Sheets-Sheet 1

INVENTOR.
John A. Richter
BY Roger L. Martin

Nov. 30, 1971   J. A. RICHTER   3,623,307
FRUIT PICKING DEVICE
Filed June 9, 1969   8 Sheets-Sheet 3

INVENTOR.
John A. Richter
BY Roger L. Martin

Nov. 30, 1971 J. A. RICHTER 3,623,307
FRUIT PICKING DEVICE
Filed June 9, 1969 8 Sheets-Sheet 4
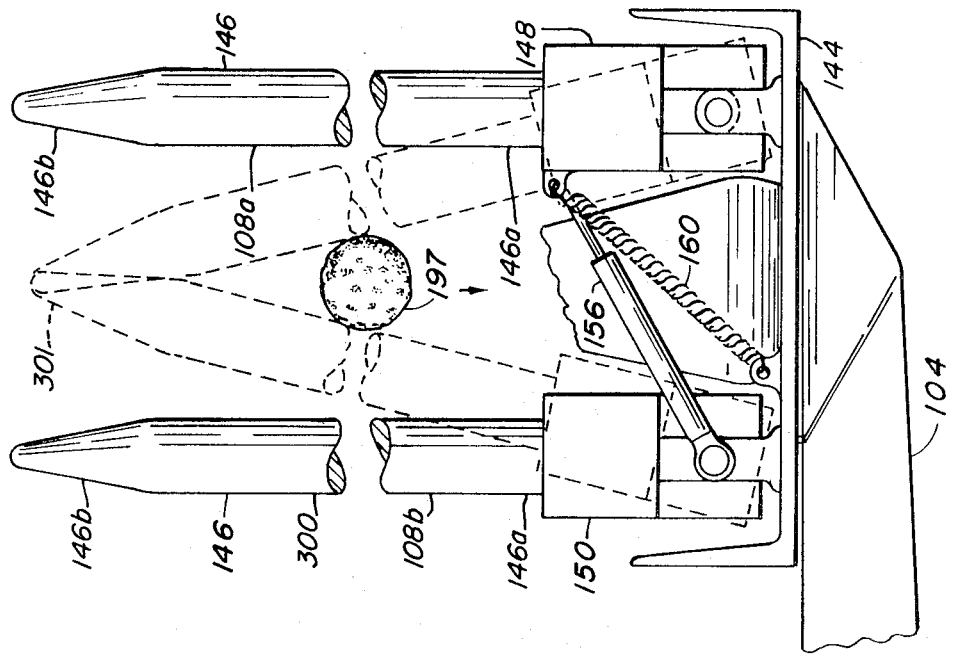
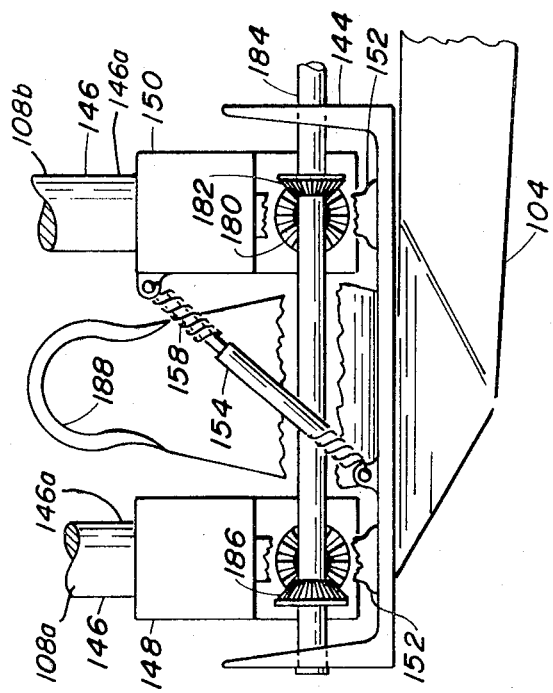
INVENTOR.
John A. Richter
BY Roger L. Martin INVENTOR.
John A. Richter
BY Roger L. Martin Nov. 30, 1971   J. A. RICHTER   3,623,307
FRUIT PICKING DEVICE Filed June 9, 1969   8 Sheets-Sheet 6

INVENTOR.
John A. Richter
BY Roger L. Martin

Nov. 30, 1971  J. A. RICHTER  3,623,307
FRUIT PICKING DEVICE

Filed June 9, 1969  8 Sheets-Sheet 8

INVENTOR.
John A. Richter
BY Roger L. Martin

# United States Patent Office 3,623,307
Patented Nov. 30, 1971

3,623,307
FRUIT PICKING DEVICE
John A. Richter, 3414 Monteen Drive,
Orlando, Fla. 32806
Filed June 9, 1969, Ser. No. 831,413
Int. Cl. A01g 19/04
U.S. Cl. 56—328 R                    8 Claims

ABSTRACT OF THE DISCLOSURE

A fruit picking device designed to simultaneously remove one or more pieces of fruit from a tree by means of a multifinger picking mechanism. A plurality of rotatably mounted fingers are mounted in parallel rows in the mechanism such that rotational motion is imparted to any piece of fruit entrapped between the rows by a three point rotating member contact involving members from each row. The picking mechanism is positioned to engage the fruit being picked through the relative cooperating movement of the structural elements comprising the device which serve both a positioning and supporting function.

---

The present invention is directed towards a fruit picking or a harvesting device adapted especially for the harvesting of citrus type fruit such as oranges, tangerines, grapefruit and the like from citrus trees.

Numerous fruit picking or harvesting machines which also have been particularly adapted to the harvesting of citrus fruit are, of course, well known in the art. A great number of these prior art harvesting machines utilized what is commonly known as the "combing principle" or "raking principle" wherein a plurality of either rigid or flexible finger-like projections are raked through portions of the citrus trees so as to cause a severing of the individual pieces of fruit from their associated stem due primarily to a pulling force applied either to the stem or to the piece of fruit. The majority of these known fruit picking devices, however, are unacceptable in the citrue industry due to the damage either to the fruit or to the tree during the picking process when the picking apparatus is "raked" through the tree. Citrus fruit in particular is susceptible to a type of damage termed "plugging" in the citrus industry. "Plugging" refers to a break or fracture of the skin of the fruit in the immediate area adjacent to the junction of the stem and the skin. This fracture is often times in the form of a small aperture in the skin of the fruit which renders the fruit vulnerable to early spoilage since the fracture of the skin of the fruit at the area of the stem serves as a port of entry or breeding area for bacteria and insects. "Plugging" has long been a serious problem in the citrus industry which has been reduced only through the use of practiced workers in the art of picking citrus fruit. It has been found that "plugging" may be eliminated only through imparting a torsional force to the fruit due to a twisting of the fruit relative to the stem and tree to which it is attached. In order to reduce labor costs, the citrus industry has tried to utilize a variety of mechanical pickers. The majority of these mechanical pickers utilize a pulling action on the fruit and therefore did not eliminate the problem of "plugging" in that the pulling action resulted in a tensional force to separate the fruit from the trees.

The present invention differs from prior art mechanical fruit harvesting devices in that the fruit is severed from its stem or its supporting tree by use of rotational forces applied to the fruit in what may be termed a "plane of action." This application of rotational or twisting movement and consequently torsional force to the piece of fruit being picked, simulates the use of the human hand in freeing the fruit from the tree or vine. Additionally, through the use of the various supporting and positioning structural elements of the present device, picking members of the present invention are able to be universally positioned relative to the base of the fruit packing device of a fruit bearing tree so as to pick the fruit in either a selective or complete manner from the tree, regardless of the position of the device.

More specifically, the concept used by the subject invention, particularly in picking citrus fruit, utilizes what may be referred to as a "plane of action" positioned relative to the fruit being severed. Since it is well known that three points determine a plane, a planar contact of the individual fruit may be obtained through the use of a plurality of axially rotatable fruit picking members or fingers any three of which may simultaneously engage a single piece of fruit. Since the "plane of action" which may be defined by these points of contact of the fruit with the three cooperating picker members, may be arranged so as to be substantially normal (perpendicular) to the stem of the fruit, it follows that the turning of the fruit in the place of contact will impart a torque to the stem. This torque will be applied essentially in the area of the junction of the stem with the tree and the junction of the stem with the fruit. Consequently, severance will then occur at either the shank of the stem, the membrane between the end of the stem and the end of the fruit or upward on the twig of the tree. These locations are all acceptable in regards to the unwanted condition previously referred to as "plugging" and will not create a condition of spoilage in the picked fruit. In addition, careful and precise positioning of the picker assembly will result in elimination of the damage to the tree itself in that the picker hand assembly of the present invention does not pass through the tree in a "raking" fashion.

The novel features which are believed to be characteristic of this invention are set forth with particularity in the appended claims. The invention itself, however, both as to its organization and method of operation together with further objects and advantages thereof may be best understood by the reference to the following description taken in connection with the accompanying drawings, in which:

FIG. 5 is an end view taken along lines 5—5 of FIG. 2 showing further details of the operation of the picker hand assembly;

FIG. 6 is an end view taken along lines 6—6 of FIG. 2 showing further details of the picker hand assembly;

Figure 1:
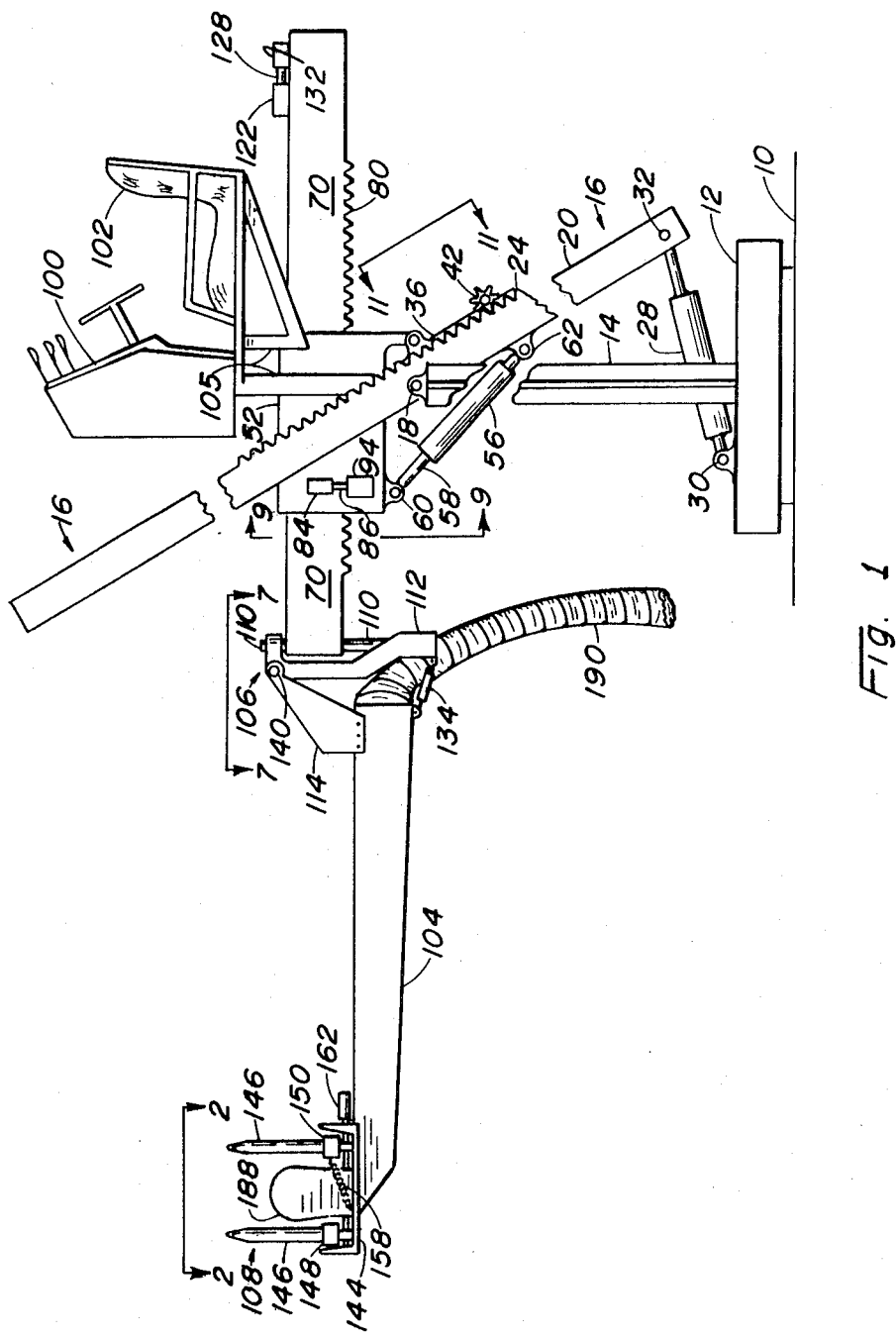
FIG. 1 is a side view of the subject assembled fruit harevsting device wherein each of the structural elements are shown in their relative position.

Referring more specifically to the drawings, FIG. 1 of the application shows a tree fruit harvesting apparatus as mounted on any supported surface 10 which is adequate for use in fruit groves or wherever the fruit harvester is to be used. The support member 10 may take the form of a vehicle or the like so that the fruit harvester may be adequately transported to the various trees in the grove. The fruit harvester may be mounted on the support member 10 by means of a rotatable support turret 12. The turret 12 includes a stanchion 14 extending upwardly in a substantially vertical direction from the turret 12. A mast member 16 is pivotally mounted to the turret 12 by being pivotally connected to the upper end of stanchion 14 at 18 intermediate the ends of mast 16.

Figure 11:
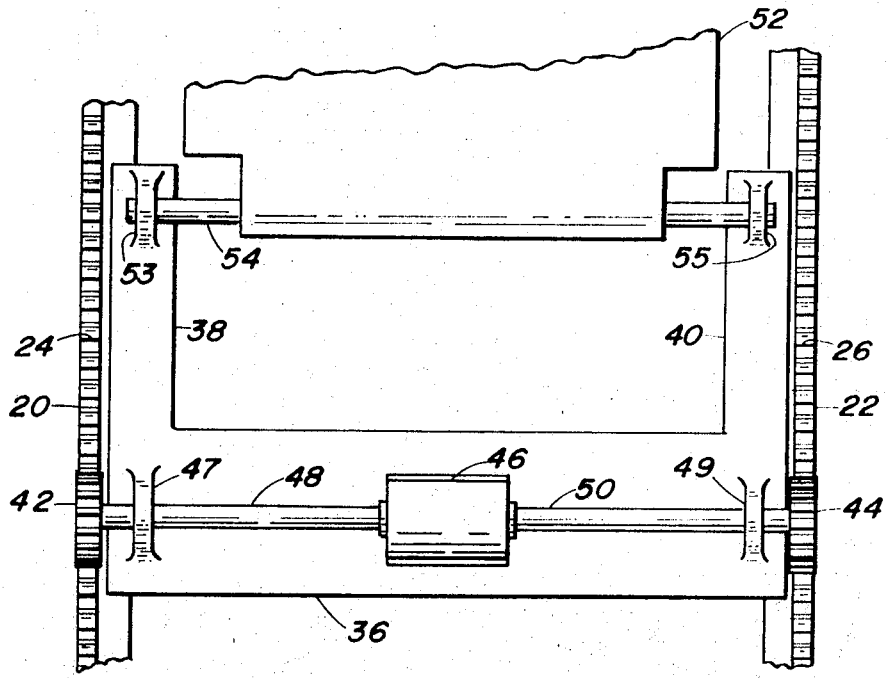
FIG. 11 is a top plan view taken along lines 11—11 of FIG. 1 showing further details of the carriage assembly.
Figure 12:
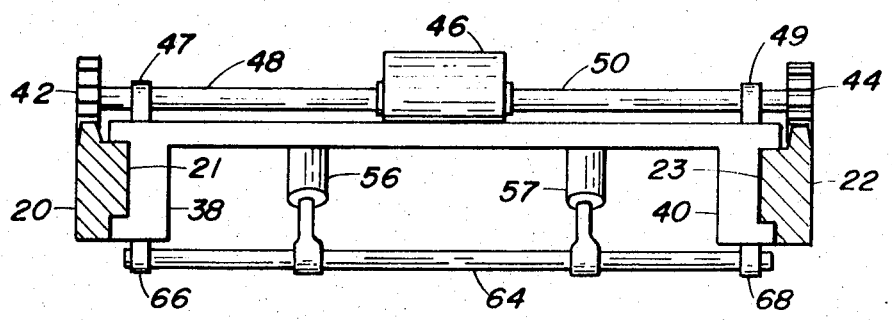
FIG. 12 is a cross sectional view of FIG. 11 showing additional details of the present invention.

As shown in FIGS. 11 and 12, the mast member 16 may include a pair of parallel rails 20 and 22 wherein the upper edge of each rail has a series of teeth forming a rack gear 24 and 26 respectively. As previously pointed out, the mast 16 is pivotally mounted on the turret along the upper end of stanchion 14 at point 18. Means to cause the mast 16 to pivot about point 18 are provided in the form of a hydraulic cylinder 28 which is pivotally connected at one end 30 to turret 12 and at the opposite end to mast 16 at point 32. Through this structural arrangement, mast 16 is allowed to pivot in a substantially vertical plane about point 18 where the amount of pivotal motion of mast 16 is limited only by the extent of reach of hydraulic cylinder 28. It is clear, of course, that other means could be used to provide pivotal motion of mast 16 about the upper end of stanchion 14.

A carriage assembly 34 is designed to travel in a direction corresponding to the longitudinal axis of mast 16. To accomplish this, the carriage assembly comprises a cross head 36, clearly shown in FIGS. 11 and 12. The cross head may take the form of a substantially U-shaped member wherein each of the legs 38 and 40 are designed to travel along rails 20 and 22 respectively. The movement of cross head 36 along rails 20 and 22 is provided by means of two pinion gears 42 and 44 which are designed to cooperate with the rack gears 24 and 26 respectively, formed along the upper or leading edge of rails 20 and 22 respectively of mast 16 as described above. Each of the pinion gears 42 and 44 are driven by a reversible fluid motor 46 through the use of drive shafts 48 and 50 mounted on cross head 36 by rotational mounts 47 and 49. Referring specifically to FIG. 12, rail members 20 and 22 of mast 16 are shown provided with inwardly directed or protruding flanges which are designed to cooperate in sliding engagement with arms 38 and 40 respectively as the driving pinions 42 and 49 move the cross head along the mast 16.

Accordingly, a carriage body 52 which comprises the main support portion of carriage assembly 34 may be moved in either direction along the longitudinal axis of mast 16 in that the carriage body 52 is pivotally mounted to rod 54 as is also shown in FIG. 11. Rod 54 is securely mounted on the outer ends of arms 38 and 40 of cross head 36 by means of pivotal mounts 53 and 55. The carriage body 52 is also attached to the cross head by means of a pair of hydraulic cylinders 56 and 57. Both hydraulic cylinders are structurally the same and consequently, a description of one is intended to be descriptive of the elements and functions of both. One end of the piston 58 which cooperates with the hydraulic cylinder 56 is pivotally attached to the underside of carriage body 52 at 60 while the opposite end of the hydraulic cylinder 56 is pivotally attached at 62 to rod 64. Rod 64 is in turn attached to the underside of arms 38 and 40 by associated mounts 66 and 68.

Figure 9:
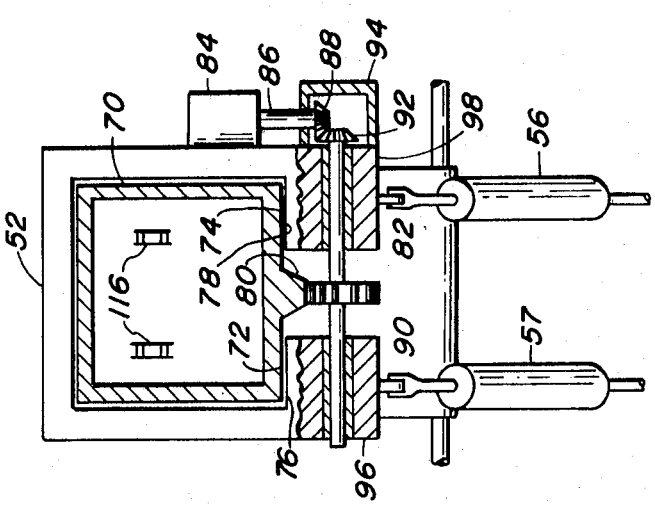
FIG. 9 is a cross sectional view taken along lines 9—9 of FIG. 1.

In addition to carriage body 52 being movable along mast 16, it is designed to cooperate in moving relationship with boom member 70. As clearly shown in FIG. 9, the carriage body 52 is hollow and is designed to partially surround the boom member 70. An external wall portion 72 and 74 of boom 70 are designed to slidingly engage an interior wall portion 76 and 78 of carriage body 52 so as to allow the boom member 70 to ride in sliding engagement on the interior of carriage body 52. Relative motion between carriage body 52 and boom 70 is provided by a rack gear 80 formed on the lower external wall of boom 70. Relative movement between carriage body 52 and boom 70 is supplied by pinion gear 82 cooperating with rack gear 80. Pinion gear 82 is driven by reversible motor 84 through a driving shaft and bevel gear 86 and 88 respectively connected to driven shaft and bevel gear 90 and 92 respectively. The reversible motor 84 may be mounted directly on carriage body 52 wherein a gear box or housing 94 is provided to encompass the intermeshing bevel gears 88 and 92. The pinion gear 82 is secured firmly to the driven shaft 90 in meshing engagement with the rack gear 80 wherein shaft 90 is rotatably mounted to the under portion of the carriage body 52 by means of a pair of rotatable bearing mounts or the like 96 and 98.

Through the above described structural arrangement, boom member 70 is allowed to move in either direction along its own longitudinal axis in a substantially horizontal plane in that hydraulic cylinders 56 and 57 also serve as a means to maintain carriage body 52 and accordingly boom 70 in a substantially horizontal plane irrespective of the angular attitude of mast 16.

The carriage body 52 further serves to support the control area or operator cockpit which comprises a control panel 100 and operator seat 102 which are supportedly mounted on carriage body 52 by means of a support base 103.

As explained previously, boom member 70 is considered part of the picking mechanism support arm assembly which itself comprises an outer arm 104, shoulder assembly 106 and boom 70. The picker mechanism, generally indicated at 108, is mounted on the outer extremity of outer arm 104 and will be fully described in great detail later.

Outer arm 104 and boom 70 are interconnected by means of shoulder assembly 106. The shoulder assembly itself comprises a shoulder pin 110 which cooperates with angular support bracket 112 in such a manner that the shoulder pin 110 extends through one end of boom 70. The shoulder assembly 106 is provided to allow pivotal motion of outer arm 104 relative to boom 70 both in a horizontal plane and in a vertical plane thereby enabling a substantially universal position of picker mechanism 108 which is limited only by the extended or retracted length of travel of the support arm assembly relative to the position of the mast and the rotational axis of the turret. Horizontal and pivotal motion of outer arm 104 relative to boom 70 is provided by the outer arm 104 being securely mounted to the angular bracket 112 by means of a hinge 114. As a result, arm 104, hinge 114, bracket 112 and shoulder pin 110 are all allowed to rotate around the central longitudinal axis of shoulder pin 110 thereby providing the pivotal or to and fro motion of arm 104 relative to boom 70 in a substantially horizontal plane. Rotation of shoulder pin 110 is provided by driving means located on the interior of boom 70.

Figure 13:
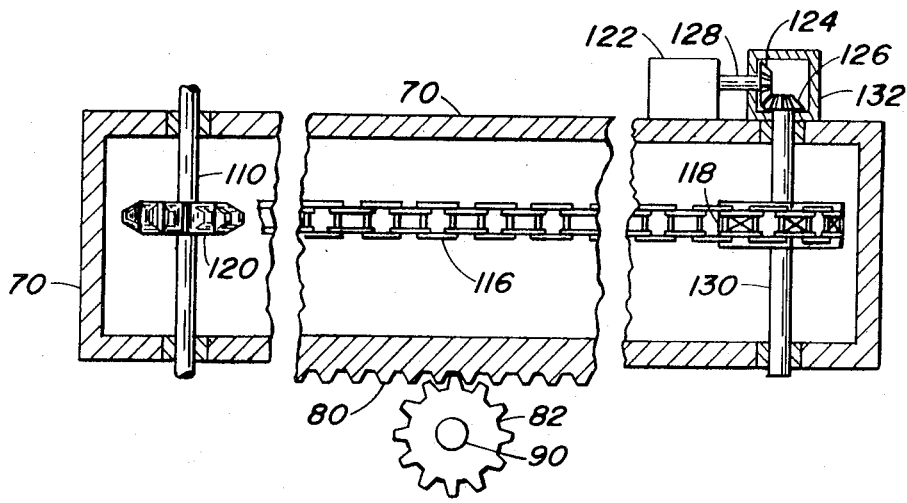
FIG. 13 is a partial cutaway and cross sectional view of the boom portion of the present invention and showing further details.
Figure 14:
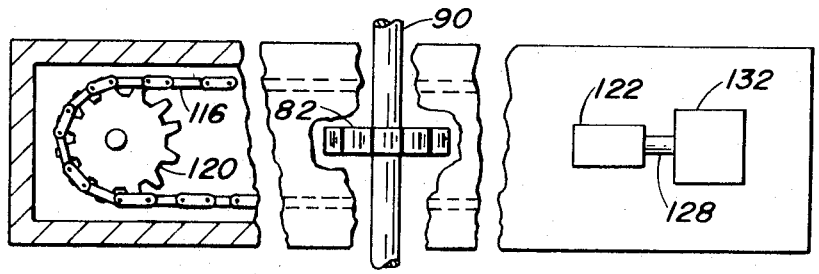
FIG. 14 is a partial cutaway and top sectional view of the boom assembly as shown in FIG. 13.

The shoulder driving means, as shown in FIGS. 13 and 14, comprises a continuous sprocket chain 116 cooperating with wheel gears 118 and 120 which are also rotatably mounted on the interior of boom 70 at each end of the continuous sprocket chain 116. One of the wheels 118 is driven by a reversible motor 122 by means of a driven bevel gear 124 cooperating with a driven bevel gear 126, each of which are connected to driving and driven shafts 128 and 130 respectively. The intermeshed bevel gears 124 and 126 are enclosed in housing 132 for protection against fouling of the gears due to dirt or dust.

Vertical motion of outer arm 104 is provided by means of hydraulic cylinders 134 and 135 which are connected at 136 and 137 respectively to the angular bracket 112 and wherein the piston rods 138 and 139, which cooperate with hydraulic cylinders 134 and 135, are connected to the lower portion of one end of outer arm 104. Upon activation of hydraulic cylinders 134 and 135, outer arm 104 may rotate about pivotal mounts 140 and 142 which pivotally connect hinge member 114 to the angular bracket 112. It is therefore seen that outer arm 104 can simultaneously move in a vertical plane relative to boom 70 and in a horizontal plane relative to boom 70 due to the multiple pivotal connections of the shoulder assembly 106 as described.

The picker mechanism which is generally indicated at 108 in FIG. 1 is mounted on the outer extremity of outer arm 104. It can be readily seen that because of its structural position on the outer extremity of outer arm 104, the picker mechanism may be positioned universally relative to the base of the device and consequently at virtually any location relative to a fruit tree due to the cooperating movement of the numerous structural elements of the fruit harvesting apparatus which has been described above. As clearly shown in FIG. 5, the picker mechanism 108 includes a channel member 144 which acts as a support base for a pair of pivotally movable finger assemblies 108a and 108b of the picking mechanism 108 and serves to mount the assemblies 108a and 108b at the outer extremity of arm 104.

The picker mechanism 108 is disclosed in detail in FIGS. 2 through 6. As therein disclosed, each of the assemblies 108a and 108b includes a plurality of elongated finger-like members 146 which are spaced apart in a row in each assembly and which are mounted at their proximal ends 146a in a gear box for rotation about their longitudinal axes. The gear boxes for assemblies 108a and 108b are designated at 148 and 150 respectively. The finger members 146 are mounted in parallel in each assembly and are so spaced apart in their assembled condition and transversely staggered with respect to the finger members of the other assembly as to provide a space between adjacent members in each assembly which will accommodate reception of the distal end of the finger member opposite thereto when the assemblies are pivotally moved to the closed assembly position 301 represented by broken lines in FIG. 5. The arrangement thus permits the distal ends 146b of the members 146 in one assembly to become interposed in the spaces between the distal ends of the members 146 of the other assembly when the assemblies 108a and 108b are pivotally moved from the open assembly position designated at 300 to the closed assembly position shown in broken lines in FIG. 5 and designated at 301.

Figure 4:
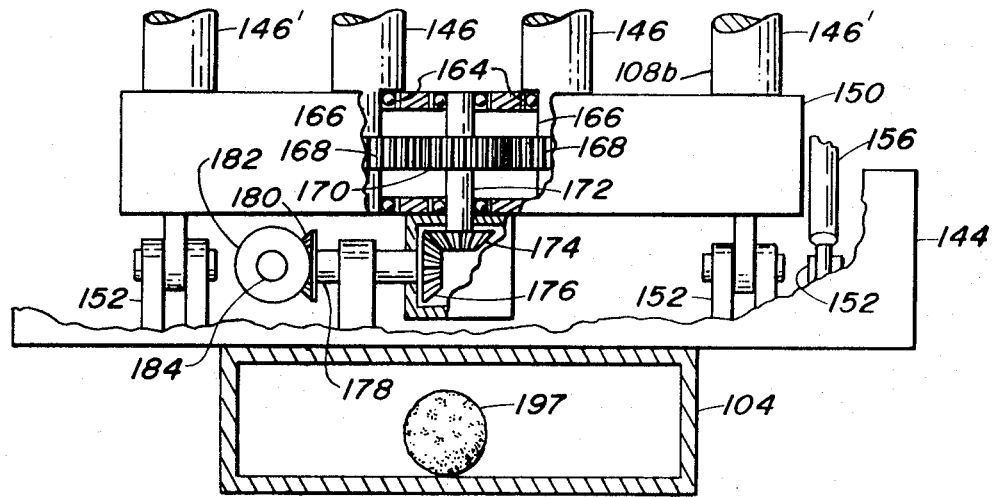
FIG. 4 is a partial cutaway view taken along lines 4—4 of FIG. 2 showing further details of the picker hand assembly.
Figure 7:
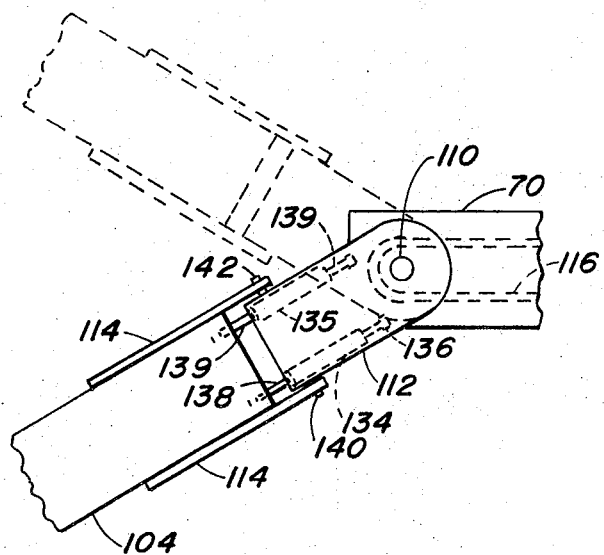
FIG. 7 is a top plan cutaway view taken along lines 7—7 of FIG. 7 showing details of the shoulder assembly.
Figure 8:
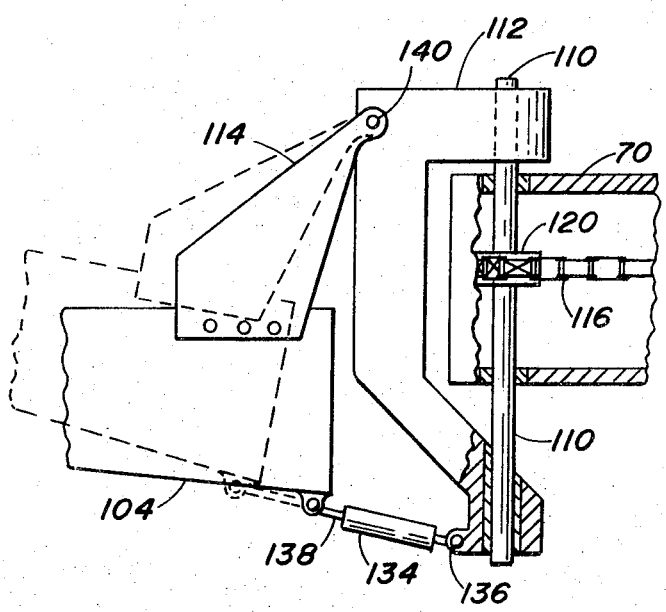
FIG. 8 is a side view showing additional features of the shoulder assembly of FIG. 7.
Figure 10:
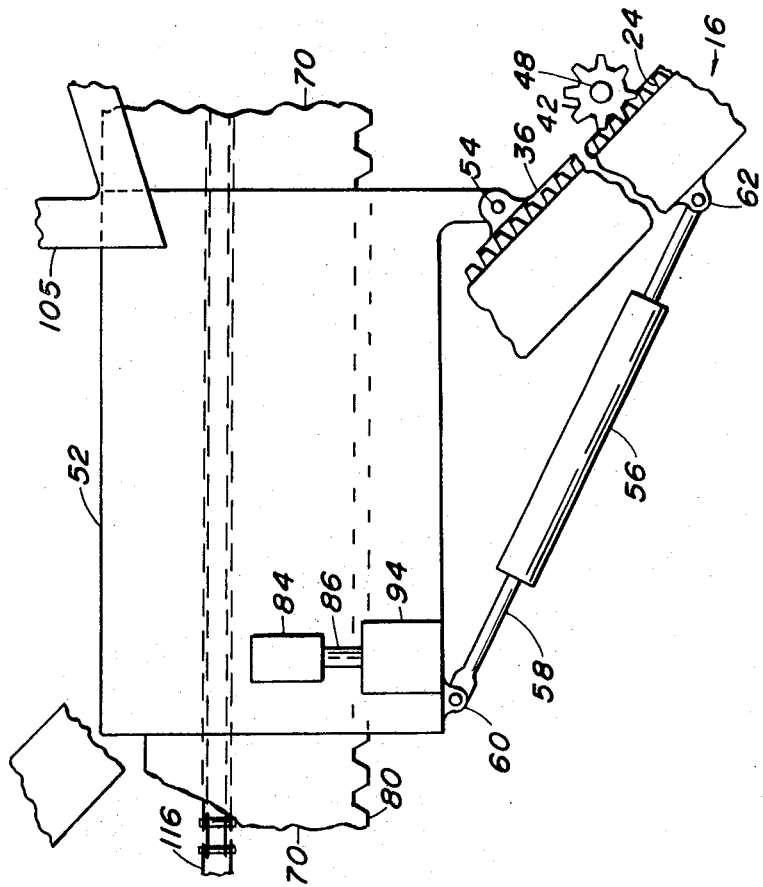
FIG. 10 is a partial cutaway view of the carriage assembly.

With specific reference to FIGS. 4 and 5, gear boxes 148 and 150 are pivotally mounted to channel member 144 by means of hinge mounts 152 which allows each of the assemblies 108a and 108b to pivot inwardly from the open assembly position 300 to the closed assembly position 301 represented by the broken lines in FIG. 5. It can be readily seen that as the assemblies 108a and 108b are brought into position 301, tree attached fruit 197 received in the space between the assemblies is trapped and encountered by at least three of the picker members 146. Pivotal movement of assemblies 108a and 108b is accomplished by means of hydraulic cylinders 154 and 156 and biasing means 158 and 160 that are located at both ends and connected to the gear boxes 148 and 150 and channel member 144 are shown in the drawings.

The axial rotation of each of the picker members 146, which has previously been referred to, is provided by a drive assembly which comprises a plurality of intermeshing gears housed within the gear boxes 148 and 150 and driven from reversible motor 162 through a plurality of bevel gears.

Figure 2:
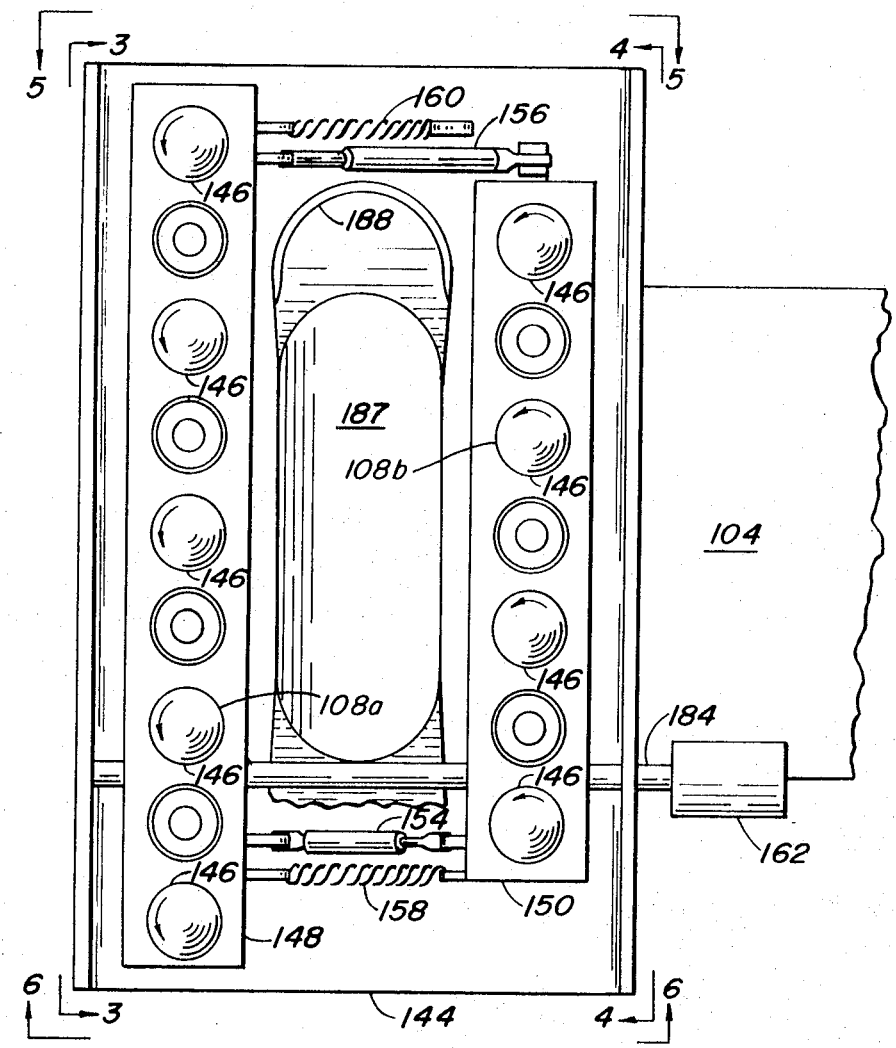
FIG. 2 is a top plan view taken along lines 2—2 of FIG. 1 showing details of the picker hand assembly of the present invention.
Figure 3:
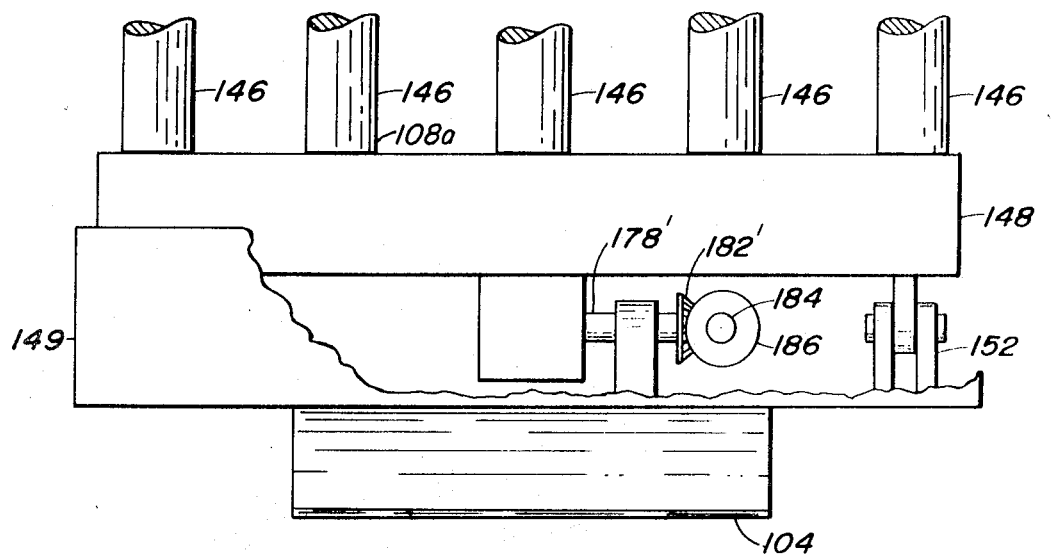
FIG. 3 is a side view taken along lines 3—3 of FIG. 2 showing further details of the picker hand assembly.

More specifically, as shown in FIG. 4, each of the picker members or fingers 146 associated with the assemblies 108a and 108b is mounted by means of bearing mounts 164 such that the base or stem 166 at the proximal end 146a of each finger 146 extends through the gear housing and is joined to a wheel gear 168. Each of these wheel gears 168 in turn meshes with the adjacent wheel gears such that the two wheel gears associated with a central driving wheel gear 170 is driven by gear 170 and in turn drives the next adjacent wheel gear associated with the outer finger members which are designated as 146' for clarity. The central gear wheel 170 is mounted on one end of shaft 172 which has a bevel gear 174 mounted at its opposite end. Bevel gear 174 is in turn driven by a cooperating bevel gear 176 which is attached to one end of driven shaft 178 which has bevel gear 180 located at its opposite end. Bevel gear 180 cooperates with driving bevel gear 182 mounted on driving shaft 184. As shown in FIG. 2, shaft 184 is connected to reversible motor 162 which also forms part of the picker mechanism. The driving system was described in reference to FIG. 4 which is a breakaway view of gear box 150. However, it should be noted that the driving arrangement for assembly 108a is essentially identical to that as described in FIG. 4 with reference to assembly 108b. The driving arrangement associated with assembly 108a differs only in that the driving train of gear box 148 is driven off of bevel gear 186 (FIG. 6) mounted on shaft 178. In addition, the central finger in the assembly 108a would be connected directly to a central wheel gear which corresponds to wheel gear 170 in that the location of such a corresponding base wheel gear would correspond to the position of the central finger member in assembly 108a. The central gear 170 corresponds to an open space in the gear box 150 and consequently gear 170 is not directly mounted on any picker member.

It should be noted that driving motor 162 may be made reversible so as to rotate the finger members 146 in either direction. It is important to note, however, that the driving assembly just described must be so arranged that all fingers 146 of both assemblies are rotated in the same direction. This rotational arrangement clearly shown by representative arrows in FIG. 2 causes tree suspended fruit 197 entrapped in the space between the assemblies 108a and 108b to be engaged between at least three picker members in the assemblies as the assemblies are pivotally moved to position 301, and this provides a three point rotating member 146 contact with the suspended fruit and which involves two adjacent fingers in one finger assembly and the finger in the other assembly which becomes interposed in the space between the adjacent fingers.

One the fruit is severed from the tree, it passes through aperture 186 formed in the channel 144 arranged between the rows of picker members 146. A deflector member 188 is mounted on the end of the picker mechanism and between the finger assemblies such that any piece of fruit severed from the tree by the outermost finger members on the row may be properly guided in the aperture 187. After the fruit is severed from the tree it falls through aperture 186 and into the interior of outer arm 104 which forms part of the conveyor system transporting the fruit from the picker mechanism to a storage hopper which may be associated with the platform on which the picking device is mounted. The fruit may pass through the hollow interior portion of outer arm 104 by any means convenient or well known in the art such as gravity. A chute 190 may be associated with the inner end of outer arm 104 so as to guide the fruit from arm 104 to a storage hopper or bin as previously outlined. The chute 190 may be made from any material and may be flexible if desired so as to provide proper handling of the fruit.

In operation, the fruit picking device may be mounted on a vehicle or other movable platform so as to bring the picking mechanism into working relationship with any tree or fruit bearing plant in the grove or orchard.

Through the relative and cooperating movement of the various structural elements such as the turret 12, mast 16, carriage assembly 34, boom 70, outer arm 104, shoulder assembly 106 and picker mechanism 108, the picker mechanism can be universally located at virtually any position on the inner or outer portions of a fruit bearing tree. The precise control and positioning of the fruit picking mechanism is, of course, directed from a control panel 100 by an operator designed to ride in cockpit 102.

The various pieces of fruit on the tree will be individually severed from the tree by the precise operation of the picker mechanism 108. More specifically, as shown in FIG. 5, the picker mechanism is positioned relative to a piece of fruit such as an orange 197, in a manner such that the tree suspended orange is located between the assemblies 108a and 108b while the latter are in the open position 300. When the picker hand assembly is properly positioned, the assemblies 108a and 108b are pivotally moved to the closed position 301 so that the orange 197 is securely trapped and simultaneously contacted by at least three of the finger members 146. Due to the rotational movement in the same direction of each of the finger members 146, rotational movement is imparted to the orange 197 so as to set up torsional forces between the orange, the stem, and the point of contact between the stem and the rest of the tree. These torsional forces serve in part to sever the orange from the tree, as is described above.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A tree fruit harvesting apparatus having a fruit picking mechanism that includes a pair of assemblies, each of said assemblies comprising a plurality of elongated, parallelly arranged, generally upright mounted members which have proximal and distal ends and which are spaced apart one from the next in a row that is transversely spaced apart at the proximal ends of the assembled members from the row of members in the other assembly, said members being mounted at their proximal ends for rotation about their respective longitudinal axes, said assemblies being arranged in an open assembly position at which the assemblies are spaced apart at the distal ends of the members thereof to accommodate reception of tree suspended fruit in the space between the rows, the members in each of said rows having a transversely staggered arrangement with respect to the members in the other of said rows such that at least one member in one assembly is relatively centered with respect to two opposite members in the other assembly, and said assemblies being relatively pivotally movable between said open assembly position and a closed assembly position at which distal ends of members of one assembly are interposed in respective spaces between the distal ends of adjacent members of the other assembly to thereby trap suspended fruit received in the space between said rows; said mechanism further including means for relatively pivotally moving said assemblies between said open and closed assembly positions, and means for rotating the elongated members about their respective longitudinal axes; the elongated members of said assemblies being so arranged at the closed assembly position with respect to tree suspended fruit trapped in the space between said rows as to cooperatively provide three point rotating member contact with the trapped fruit.

2. A tree fruit harvesting apparatus in accord with claim 1 where said assemblies are pivotally movable about respective pivot axes, and where said means for relatively pivotally moving said assemblies includes hydraulic means.

3. A tree fruit harvesting apparatus in accord with claim 1 where said mechanism has an aperture for receiving fruit picked thereby and which is located between said assemblies and at the proximal ends of the members thereof.

4. A tree fruit harvesting apparatus in accord with claim 1 further comprising a support turret rotatably mounted on a support base, a mast pivotally mounted on said turret means to pivot said mast relative to said turret in a substantially vertical plane, a carriage assembly having means to move the carriage assembly along the longitudinal axis of said mast; said picking mechanism being positionable with respect to the fruit by cooperating movement of said turret, said mast and said carriage assembly.

5. A tree fruit harvesting apparatus comprising a support turret rotatably mounted on a support base, a mast pivotally mounted on said turret, means to pivot said mast relative to said turret in a substantially vertical plane, a carriage assembly having means to move the carriage assembly along the longitudinal axis of said mast, and a picking mechanism positionable with respect to the fruit by cooperating movement of said turret, said mast and said carriage assembly.

6. A tree fruit harvesting apparatus as in claim 5 wherein said carriage assembly further comprises a carriage body, said means to move said carriage assembly along said mast comprises a cross head movably mounted on said mast, said carriage body being pivotally connected to said cross head, and said cross head being arranged in supporting relation between said mast and said carriage body.

7. A tree fruit harvesting apparatus as in claim 6 further comprising means to pivot said carriage body relative to said cross head so as to maintain said carriage assembly in a substantially horizontal plane, irrespective of the attitude of said mast.

8. A tree fruit harvesting apparatus comprising a rotatably mounted support turret, a carriage assembly movably supported relative to said support turret, and an arm assembly movably mounted on said carriage assembly in a manner such that the arm assembly is movable along its own longitudinal axis relative to the carriage assembly; said arm assembly comprising a boom, an outer arm, a shoulder connection pivotally connecting said outer arm to said boom, and drive means cooperating with said shoulder in providing movement of said outer arm relative to the longitudinal axis of the boom in both vertical and longitudinal planes.

References Cited
UNITED STATES PATENTS

| | | | |
|---|---|---|---|
| 2,953,229 | 9/1960 | Wiegel | 56—328 |
| 3,077,720 | 2/1963 | Groves et al. | 56—328 |
| 3,222,855 | 12/1965 | Lasswell, Jr. | 56—328 |
| 3,347,587 | 10/1967 | Frost | 56—328 X |
| 3,401,514 | 9/1968 | Clark | 56—328 |
| 3,413,787 | 12/1968 | Van Antwerp et al. | 56—328 |
| 3,425,202 | 2/1969 | Setzer | 56—328 |
| 3,491,521 | 1/1970 | Danford | 56—328 |

LOUIS G. MANCENE, Primary Examiner

J. N. ESKOVITZ, Assistant Examiner